United States Patent Office 2,724,724
Patented Nov. 22, 1955

2,724,724

PREPARATION OF CONCENTRATED SOLUTIONS OF ALKYLCHLOROPHENOXYACETATES

Max Gonze, Brussels, Belgium, assignor to Solvay & Cie, Brussels, Belgium, a Belgian company No Drawing. Application December 5, 1951,
Serial No. 260,118

Claims priority, application Belgium January 8, 1951

5 Claims. (Cl. 260—521)

The present invention relates to the preparation of concentrated solutions of alkali metal salts or of ammonium salts of alkylchlorophenoxyacetic acids, and more particularly to the preparation of sodium salts of 2 methyl 4 chloro- and 2 methyl 6 chlorophenoxyacetic acids.

It is known that solutions of sodium alkylchlorophenoxyacetates can be prepared by condensation of the corresponding alkylchlorophenols with monochloroacetic acid in presence of sodium hydroxide or carbonate. This condensation is accompanied by the formation of an equimolecular quantity of sodium chloride and varying quantities of secondary products which remain dissolved in the aqueous solution of alkylchlorophenoxyacetates. Since the chlorides, particularly sodium chloride, reduce substantially the solubility in water of alkylchlorophenoxyacetates, this process gives a practically saturated aqueous solution containing only 15% sodium alkylphenoxyacetates. In order to obtain more concentrated solutions, it is necessary to separate the alkylchlorophenoxyacetates from the accompanying soluble impurities, particularly sodium chloride. It has been proposed for this purpose to treat the soluble organic salts with a mineral acid so as to generate the corresponding organic acids. The alkylchlorophenoxy acids being insoluble in aqueous solutions may then be separated and washed with water, then treated with a hydroxide or an alkali metal carbonate in order to regenerate the soluble salts. These now freed from alkali metal chlorides, are water soluble up to about 40% by weight.

The preparation of concentrated solutions according to this known process requires three operations, namely condensation, acidification and neutralisation. The final yield in soluble salts of alkylchlorophenoxyacetic acid is the product of the respective yields of each of these operations, so that the total yield is necessarily reduced. The process also requires an excessive consumption of reagents due to the successive acidification and neutralisation reactions.

The object of the present invention is to provide an economical process of making concentrated solutions of alkali metal or of ammoniacal salts of alkylchlorophenoxyacetic acids, while avoiding the intermediate stage of forming alkylchlorophenoxy acids.

The process according to the invention comprises the operations consisting in preparing insoluble alkaline earthy salts of the alkylchlorophenoxyacetic acids, separating therefrom the water soluble impurities and transforming the purified in soluble salts into soluble salts of an alkali metal or of ammonium by double decomposition with an alkali metal or ammonium hydroxide or carbonate.

The alkaline earthy salts used in the present process, for example calcium salts of the methylchlorophenoxyacetic acids, may advantageously be prepared by condensation of a monochlorocresol with monochloroacetic acid in presence of lime, as described in my application for Belgian patent Ser. No. 390,041 of December 15, 1950. According to this process, the condensation by means of lime is effected from a chlorocresol which is concentrated into a compound containing at least 75 mol% of 2 methyl 4 chlorophenuol or of 2 methyl 6 chlorophenol. The calcium methylchlorophenoxyacetates thus obtained are solid at condensation temperature; they can thus be easily separated and washed at any temperature lower than or equal to condensation temperature. After a double decomposition with a hydroxide or a carbonate in solution, a concentrated solution of soluble salts is obtained.

In the process according to this invention, however, the production of calcium salts which are liquid at condensation temperature entails no serious inconvenience. It is therefore possible to perform the condensation of a crude monocresol with monochloroacetic acid in presence of lime. In fact the calcium salts need not be withdrawn from the condensation apparatus where a suitable temperature can be maintained until the impurities which are soluble in hot water are completely dissolved. After the aqueous solution is removed, the calcium salts are repeatedly washed with hot water and the washing water is removed. Into the washed product there is introduced an aqueous solution of an alkali metal or ammonium hydroxide or carbonate and the double decomposition is performed, preferably at elevated temperature. When the decomposition is completed, the solution is filtered to separate the alkaline earth hydroxide or carbonate. By controlling the concentration of the aqueous hydroxide or carbonate solution introduced, there is obtained a solution of soluble salts of alkylchlorophenoxyacetic acids at a concentration near saturation, which is practically free of chlorides and other secondary condensation products.

Although the operation then is less economical, it is also possible, without departing from the scope of the invention, to prepare the alkaline earthy salts of alkylchlorophenoxyacetic acids by treating with an alkaline earth chloride, the soluble salts obtained by condensation in presence of an alkali metal hydroxide. The conversion of the soluble salts into alkaline earthy salts is advantageously carried out at elevated temperature so as to keep the products formed in the liquid state.

However, if the condensation in presence of caustic soda is started from monocresols enriched in 2 methyl 4 chlorophenol, the calcium salts obtained by treatment of the sodium salts with a solution of calcium chloride are solid and crystalline at elevated temperature. These calcium salts can easily be freed from their soluble impurities by washing with water.

The calcium salts, whether solid or liquid, are then treated in accordance with this invention in the same manner as those obtained directly by condensation of a chlorocresol with monochloroacetic acid in presence of an alkaline earth hydroxide.

The double decomposition of alkaline earthy salts into of alkali metal or ammonium salts by means of the corresponding hydroxide or carbonate is effected in presence of an excess of reagent. This excess, which varies with the operating temperature, usually does not exced 25%. The concentrated solution of soluble salts contains as its main though not objectionable impurity the excess of reagent used for the double decomposition of the insoluble salts. The pH of the solution may be lowered, if necessary, by blowing $CO_2$.

*Example 1*

Into a condensation apparatus provided with stirring means I introduce 14.25 kgs. of crude monochlorocresols consisting of a mixture at 60 mol % of 2 methyl 4 chlorophenol, 8.51 kgs. of slaked lime, 9.45 kgs. of monochloroacetic acid and 35 kgs. of water. I heat under reflux for two hours, the condensation mother liquor is withdrawn and the liquid calcium methylchlorophenoxyacetates are washed twice with about 16 kgs. of water at 90° C. After separating the washing water I add to the calcium salts 21.5 kgs. of a 25% solution of $Na_2CO_3$ and keep stirring the mixture at 90° C. for about one hour and a half. The solution is filtered and about 35 kgs. of filtrate are obtained, which consist of a solution at about 40% of sodium methylchlorophenoxyacetates containing 2% by weight of excess sodium carbonate. The precipitate of calcium carbonate is washed on a filter with about 15 kgs. of water. About 17 kgs. of washing liquor are collected which contain about 10% sodium methylchlorophenoxyacetates and 0.5% $Na_2CO_3$. This solution may be sold as such as a selective weedkiller, or it may be concentrated by evaporation until a 40% solution is obtained, or again it may be returned to the manufacturing cycle, for example for the preparation of the sodium carbonate solution.

Example II

I introduce into the condensation apparatus 14.25 kgs. of monochlorocresols with 41° C. melting point containing about 90 mol per cent of 2 methyl 4 chlorophenol, 9.45 kgs. of monochloroacetic acid, 7.4 kgs. of lime and 35 kgs. of water. The mixture is heated under reflux for 2 hours. A precipitate of solid calcium methylchlorophenoxyacetates is obtained which is filtered to separate therefrom the condensation mother liquor. The precipitate is washed twice on a filter with about 20 kgs. of water altogether. To the dried precipitate I add a 17.5% solution of sodium carbonate and I stir at 90° C. for two hours. The suspension is filtered and 51 kgs. of a solution is obtained, which contains 32% of total methylchlorophenoxyacetates, whose efficacy as a weedkiller is at least equal to that of the 40% solution obtained in the preceding example. The calcium carbonate precipitate is washed twice with 10 kgs. of water and I collect 10.5 kgs. of a 10% solution of sodium methylchlorophenoxyacetates. The weedkilling or phytohormonal properties of solutions prepared by this process are particularly high, even at lower concentration, on account of the high percentage of sodium 2 methyl 4 chlorophenoxyacetate in the total methylchlorophenoxyacetates.

Example III

Into the condensation apparatus there is introduced 14.25 kgs. of crude monochlorocresols at 60 mol percent of 2 methyl 4 chlorophenol, 9.45 kgs. of monochloroacetic acid, 8 kgs. of caustic soda and 35 kgs. of water. The mixture is kept at reflux temperature while stirring for 1 hour. The solution of sodium methylchlorophenoxyacetates is immediately treated with 24 kgs. of a 25% solution of calcium chloride previously brought up to 90° C. When precipitation of the calcium salts is completed, the mother liquor of crystallisation is withdrawn and the precipitate is repeatedly washed with water at 90° C. The liquid calcium salts are then converted into sodium salts by a solution of sodium carbonate according to the operating method previously described in Example I.

The examples given above do not limitate the invention as for example potassium, lithium or ammonium carbonate may be used in place of sodium carbonate.

The double decomposition may also be effected with alkali metal or ammonium hydroxides. The reaction with hydroxides is quicker and already starts in the cold, but special precautions must be taken to obtain a precipitate of $Ca(OH)_2$ capable of being easily separated.

In the following claims the term "alkali metal" is to be understood to include ammonium.

I claim:

1. A process of preparing concentrated aqueous solutions of soluble salts of alkylchlorophenoxyacetic acids selected from the group consisting of alkali metal salts and ammonium salts which comprises preparing an insoluble alkaline earth salt of the corresponding alkylchlorophenoxyacetic acids, separating therefrom any water soluble impurities, transforming the purified insoluble salt into said soluble salts by double decomposition with a member of the group consisting of ammonium and alkali metal hydroxides and ammonium and alkali metal carbonates, and separating the resulting concentrated solution of said alkylchlorophenoxyacetic acid salts.

2. A process of preparing concentrated solutions of sodium 2-methyl-4-chlorophenoxyacetate, which comprises preparing calcium 2-methyl-4-chlorophenoxyacetate, separating therefrom any water insoluble impurities, transforming the purified calcium salt into sodium 2-methyl-4-chlorophenoxyacetate by reacting said calcium salt with a member of the group consisting of sodium hydroxide and sodium carbonate, and separating the resulting concentrated solution of sodium 2-methyl-4-chlorophenoxyacetate.

3. A process as defined in claim 1, wherein the alkaline earth alkylchlorophenoxyacetates are prepared by condensation of the corresponding alkylchlorophenols with monochloroacetic acid in the presence of an alkaline earth hydroxide.

4. A process as defined in claim 1, wherein the alkaline earth alkylchlorophenoxyacetates are prepared by reaction of the corresponding alkali metal salts with an alkaline earth chloride and the resulting salts are washed and treated with an aqueous solution of an alkali metal carbonate.

5. In a process as defined in claim 1, the further step of controlling the pH value of the final concentrated solution by blowing carbon dioxide thereinto.

References Cited in the file of this patent

FOREIGN PATENTS

| | | |
|---|---|---|
| 573,476 | Great Britain | Nov. 22, 1945 |
| 573,478 | Great Britain | Nov. 22, 1945 |

OTHER REFERENCES

Zemylanitzuin: Chem. Abstracts, vol. 29, col. 1215 (1935).